United States Patent
Rijavec

(10) Patent No.: US 8,699,081 B2
(45) Date of Patent: Apr. 15, 2014

(54) HALFTONING RUN LENGTH ENCODED DATASTREAMS

(75) Inventor: Nenad Rijavec, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 266 days.

(21) Appl. No.: 13/179,970

(22) Filed: Jul. 11, 2011

(65) Prior Publication Data

US 2013/0016401 A1    Jan. 17, 2013

(51) Int. Cl.
*H04N 1/405* (2006.01)
(52) U.S. Cl.
USPC .......... 358/3.06; 358/1.9; 358/1.15; 358/3.23
(58) Field of Classification Search
None
See application file for complete search history.

(56) References Cited

U.S. PATENT DOCUMENTS

| 5,543,935 A | 8/1996 | Harrington |
| 6,205,255 B1 * | 3/2001 | Mak ............................... 382/245 |
| 6,317,222 B1 * | 11/2001 | Eldridge et al. ............... 358/2.1 |
| 7,123,174 B1 * | 10/2006 | Eldridge et al. ................ 341/63 |
| 2002/0186414 A1 | 12/2002 | Crossland et al. |
| 2007/0081733 A1 * | 4/2007 | Matsuhira ...................... 382/245 |
| 2007/0236741 A1 * | 10/2007 | Tai et al. ....................... 358/3.12 |
| 2011/0194126 A1 * | 8/2011 | Holley ........................... 358/1.9 |

* cited by examiner

*Primary Examiner* — Dung Tran
(74) *Attorney, Agent, or Firm* — Duft Bornsen & Fettig LLP

(57) ABSTRACT

Methods and systems herein provide for halftoning of Run length (RL) encoded datastreams. In one embodiment, a print controller identifies a packet within a RL encoded datastream. The packing includes a header and a block of continuous tone data. The print controller identifies an array of conversion values for converting RL encoded data to halftone data, and indexes the array using one or more bytes of the block of bitmap data. The print controller then outputs halftone data from the conversion array based on the index to convert the RL encoded continuous tone data of the packet to halftone data for a print engine.

20 Claims, 3 Drawing Sheets

HALFTONING RUN LENGTH ENCODED DATASTREAMS

FIELD OF THE INVENTION

The invention is related to the field of printing systems and, in particular, to halftoning Run length (RL) encoded datastreams.

BACKGROUND

Print data that is transmitted between various processes within a printing system is often encoded in a Run length (RL) format to reduce the amount of bandwidth utilized to transmit the print data and/or to store the print data. Before printing the RL encoded print data, the print data is decoded and screened using a "halftone" process. Halftoning is a reprographic technique that simulates a continuous tone image with dots, where the dots may vary either in size and/or in spacing. Where continuous tone images may contain an infinite range of colors or grays, a typical halftone image generated by a printing system is a binary image comprising a limited set of colors such as black, Cyan, Magenta, Yellow, and Key black (CMYK), or Red Green Blue (RGB). This type of binary reproduction relies on the optical illusion that tiny dots can generate smooth image tones when viewed by the human eye, thus appearing to be a continuous tone image to the viewer.

Halftoning uses a high frequency/low frequency dichotomy to generate a continuous tone illusion from a halftone image. In halftoning, the low frequency component is a local area of the output image designated as a halftone cell. Each halftone cell relates to a corresponding area (size and location) of the continuous tone input image. Within each halftone cell, the high frequency component is a variable-sized halftone dot composed of ink or toner. The ratio of the inked area to the non-inked area within the halftone cell represents the luminosity of the corresponding area on the continuous tone input image. From a distance, the human eye averages both the high frequency component corresponding to the ink ratio within the halftone cell and the low frequency component corresponding to the size of the halftone cell.

In digital halftoning, a raster image processor generates a raster image, or bitmap, which comprises a 2-dimensional array of pixels (also known as pels). In order to simulate the halftone cell, the digital halftone cell contains groups of monochrome (e.g., black) or limited color pixels (e.g., CMYK) within the same sized halftone area. The location and sizes of the monochrome or limited color pixels within the digital halftone cell represent the high frequency/low frequency dichotomy of the halftone method described above.

In a typical digital printing system, Page Description Language (PDL) data, such as PostScript data, PDF (Portable Document Format) data, Intelligent Printer Data Stream (IPDS) data, Advanced Function Presentation (AFP) data, Mixed Object: Document Content Architecture (MODCA) data, or other types of PDL data is rasterized and converted into bitmap data. Monochrome data may be represented by a single 2-dimensional array of pixels, while color data may be represented by multiple 2-dimensional arrays of pixels, one for each color. The bitmap data may then be encoded to reduce the size of the data when transmitting the bitmap data through various post rasterizing processes within the printing system.

One type of RL encoding used by printing systems to reduce the size of data is PackBits. Apple Computer Inc. introduced PackBits with the release of the Macintosh® computer. A PackBits datastream includes packets with a one-byte header followed by one or more bytes of data. The header is a signed byte and defines the following data bytes as either literal data or repeat data. Literal data in PackBits represents data "as is". Repeat data in PackBits represents runs of data, which remains the same. The header in PackBits also defines the number of bytes of encoded literal data or encoded repeat data. In other words, the header encodes both the type of data (literal or repeat) and the amount of encoded data (the number of data bytes subsequent to the header). After rasterizing and encoding, the bitmap data is decoded and halftoned using a halftone screen before being sent to a print engine. The halftone screen, when applied to the bitmap data, defines the characteristics of the halftone cells used to represent the final output image. A halftone cell is a 2-dimensional matrix of threshold values. When continuous tone data is screened by the halftone cell, each pixel in the continuous tone data corresponds with one of the elements in the halftone cell. To perform the halftone process, each pixel is compared with one or more threshold values in the halftone cell to determine the halftone output value. This process is computationally intensive, and becomes more so as the bit width of an output channel on the print engine increases. Some print engines include color channels that accept multi-bit wide data. In a CMYK print engine for example, the yellow color channel (Y) may accept 2 bit binary data to describe a pel (i.e., a printed dot on a media). When generating halftone data for our example yellow color channel, each continuous tone pixel is compared to three threshold values to generate a binary output of 00, 01, 10, or 11.

One problem with halftoning data within an RL datastream, such as PackBits, is that the data is encapsulated in the RL format. This means that the datastream must be decoded before the threshold values in the halftone cell can be compared to the datastream during the halftone process. Another problem is the large number of threshold comparisons, which may be necessary when generating the halftone output data for a print engine that uses multi-bit output channels. Print engines that utilize multi-bit output channels, in particular, entail the use of multiple threshold values per pixel, which involve significant computational resources to process.

SUMMARY

Embodiments herein describe halftoning of Run length (RL) encoded datastreams using arrays of conversion values. Sequential RL packets comprising headers and bitmap data are identified from the datastream. An array of conversion values for converting the RL encoded datastream to halftone data is identified. The array of conversion values store halftone data that is indexed by RL encoded data. Thus, indexing the array directly decodes the RL encoded data to a halftone output without an intervening decoding and thresholding step. In the embodiments described, the bitmap data in the packets is used as an index to the array to output the halftone data. The use of the array of conversion values is computationally more efficient than decoding the RL data stream and performing a threshold halftone process on the decoded data.

One embodiment comprises a print controller of a printing system. The print controller includes an identification system and a control system. The identification system identifies a packet within a Run length (RL) encoded print datastream. The packet comprises a header and a block of bitmap data that is defined by the header. Also, the block of bitmap data comprises continuous tone data. The control system identifies an array of conversion values for converting RL encoded data to halftone data. The control system indexes the array using one or more bytes of the block of bitmap data, and outputs halftone data from the array based on the index to convert the RL encoded continuous tone data of the packet to halftone data for a print engine.

In another embodiment, the control system determines that the values of the array comprise successive pels of halftone data. The control system determines that the first header defines a number (n) of repeating blocks of bitmap data in the first packet. The control system then indexes the array using the block of bitmap data, and outputs (n) successive pixels of halftone data from the conversion array based on the index.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
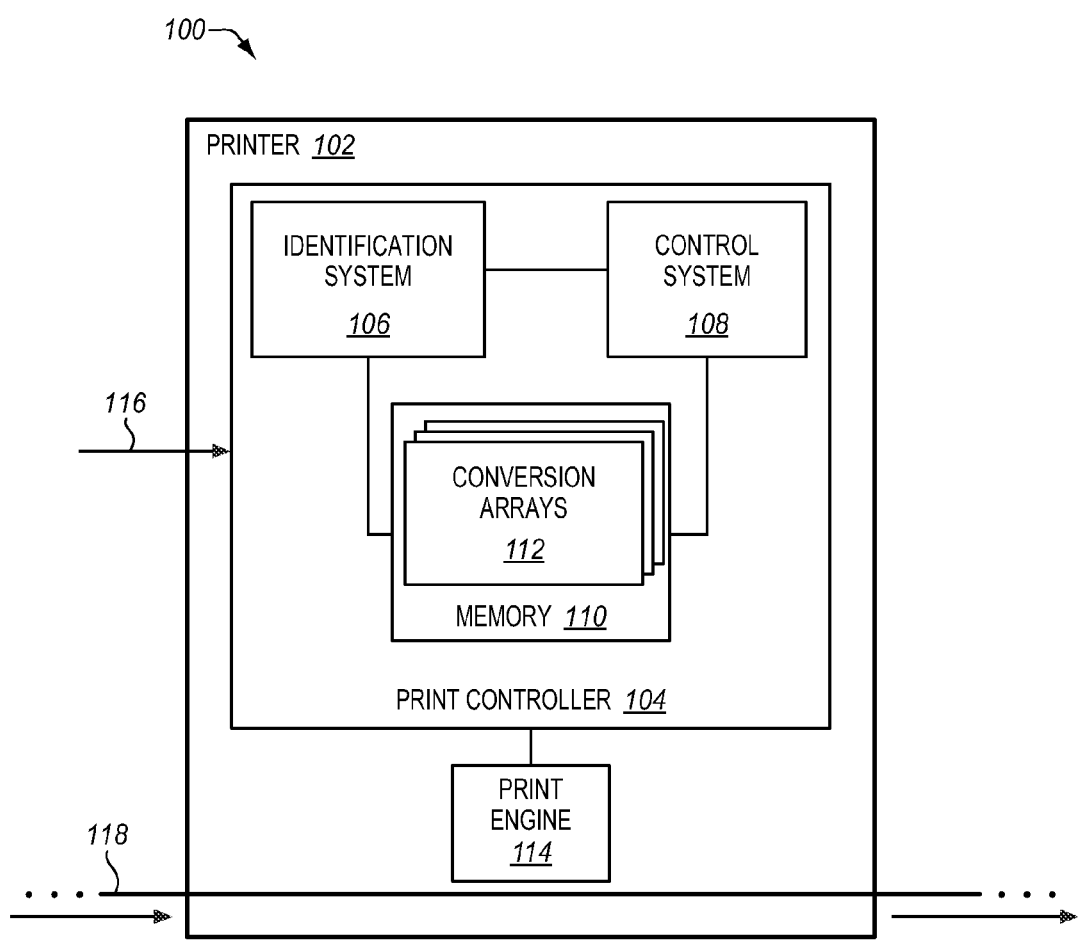
FIG. 1 illustrates a printer in an exemplary embodiment.

FIG. 1 is a block diagram of a printer 102 in an exemplary embodiment. A media 118 travels in the direction indicated by the arrow for imprinting by printer 102. Media 118 may include cut sheet media or continuous form media in a high-speed production printing system.

Printer 102 includes a print controller 104 and a print engine 114. In printer 102, print controller 104 receives a print datastream 116 for imprinting onto media 118. Print datastream 116 may include, for example, data in a number of bitmap formats and Page Description Language (PDL) formats. Examples of bitmap data formats include Joint Photographic Experts Group (JPEG), Tagged Image File Format (TIFF), Graphics Interchange Format (GIF), etc. Examples of PDL data formats include Advanced Function Presentation (AFP), Intelligent Printer Data Stream (IPDS), Mixed Object Document Control Architecture (MODCA), etc. Print controller 104 may perform a number of data processing operations on print datastream 116, such as generating raster bitmaps of the logical pages of a print job, encoding the bitmap data into an RL encoded format for storage and/or transmission to other print processes executing within print controller 104, etc. Print controller 104 also includes a memory 110 storing one or more conversion arrays 112. Conversion arrays 112 comprise an array of values for converting RL encoded continuous tone data to halftone data. Typically, RL encoded bitmap data is decoded and one or more halftone cells are applied to the decoded data to generate a halftone data output. For example, a page ripper may "rip" logical pages of a print job into RL encoded bitmap data. The RL encoded bitmap data may then be spooled to a rip spool (e.g., a hard disk or a partition on a hard disk) and/or transmitted to a page assembler that builds sheet side images from ripped logical pages. A sheet side image is a bitmap for a side of sheet of media, and may include multiple logical pages in n-up printing.

Before print engine 114 can print continuous tone data in the ripped pages, the continuous tone data is halftoned using one or more halftone cells. The halftone cells include one or more threshold values that are compared to pixels in the decoded data. For each pixel, one or more comparisons are made between the pixel value and the threshold(s) and halftone data is generated. However, decoding RL encoded data and performing the thresholding calculations is computationally expensive. In this embodiment, print controller 104 uses one or more arrays 112 of conversion values to halftone the RL encoded data in a more efficient manner. How system 100 may operate will be described with respect to FIG. 2.

Figure 2:
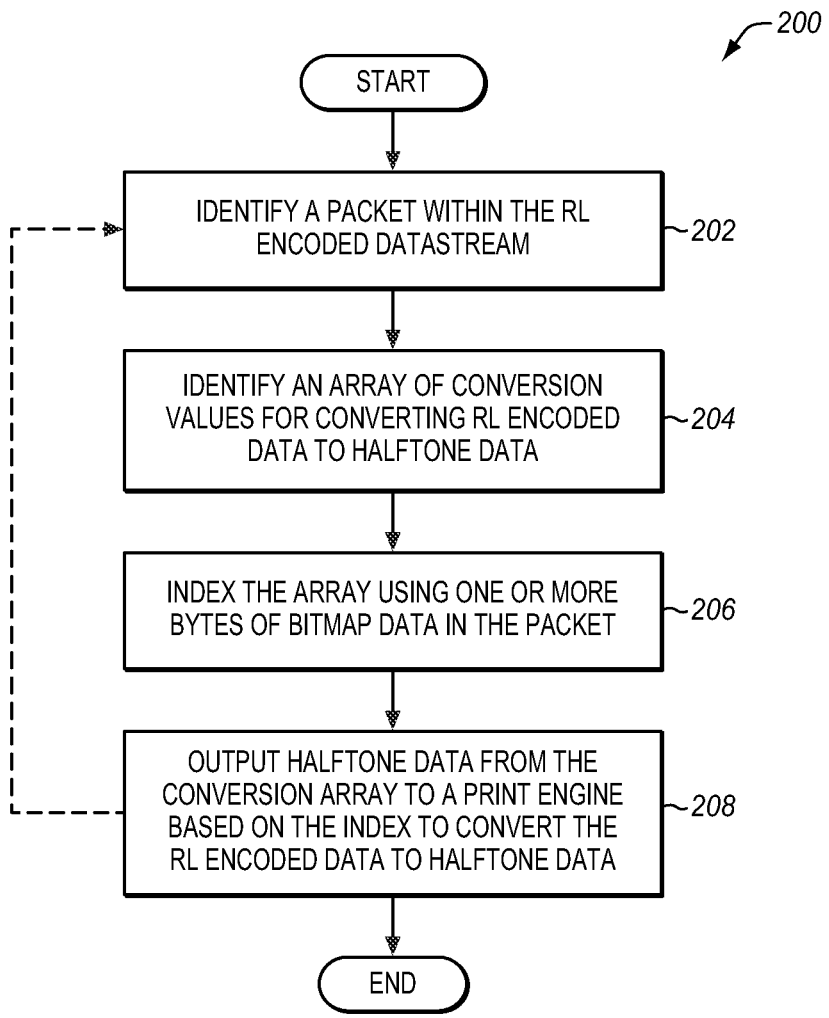
FIG. 2 is a flow chart illustrating a method of halftoning RL encoded datastreams using arrays of conversion values in an exemplary embodiment.

FIG. 2 is a flow chart illustrating a method 200 of efficiently halftoning RL encoded datastreams using arrays 112 of conversion values in an exemplary embodiment. The steps of method 200 will be described with reference to system 100 of FIG. 1, although one skilled in the art will recognize that method 200 may be performed by other systems not shown. In addition, the steps of the flow chart are not all inclusive and other steps, not shown, may be included. Further, the steps may be performed in an alternative order.

After receiving datastream 116 (e.g., from a host system not shown), print controller 104 performs a rasterization process on print datastream 116 to generate raster data. The raster data for datastream 116 may then be encoded in an RL format for storage and/or transmission to other print processes executing on print controller 104. For example, one or more processes may generate raster data for the logical pages for print datastream 116. During the printing process, raster data may be temporarily spooled to a rip spool on a hard disk (not shown) or stored in an electronic memory prior to transmission to print engine 114. When a number of logical pages are assembled onto a side of a sheet of media, other processes executing within print controller 104 may assemble raster images for the logical pages into sheet side images. In order to efficiently store the raster data and/or transmit the raster data between processes on print controller 104, the raster data is encoded in an RL format. This reduces the storage size of the data.

Prior to printing RL encoded continuous tone data, a halftoning process is performed on the RL encoded data. Identification system identifies a packet within the RL data (step 202 of FIG. 2). Packets generally define frames of data that may include headers and a one or more bytes of data. For example, in PackBits, which is a type of RL encoded data, the header of a packet defines subsequent blocks of data in the packet as literal data blocks or repeat data blocks. The header also defines the number of literal blocks of data and repeat blocks of data.

In continuing with the PackBits example, the encoded data may have a byte header that defines 16 bytes of repeat data. Instead of transmitting and/or storing 16 bytes of data, the PackBits encoded data may reduces the size of the data to just two bytes—one header byte and one data byte. The header defines the data byte as repeat data, and defines the number of repeats. Thus, the PackBits encoded data is much smaller than the original data. One skilled in the art will understand that other types of RL encoded data may include multi-byte headers and data blocks subsequent to the headers, and that the type and manner of RL encoding is a matter of design choice.

Control system 108 (see FIG. 1) identifies conversion array 112 for converting RL encoded data to halftone data (step 204 of FIG. 2). Conversion arrays 112 may define multi-dimensional halftone cells for halftoning RL encoded data, such as 3×3 elements of (m) number of elements. As an array of values, conversion arrays 112 may be indexed by bytes or multi-byte words of data. In this embodiment, conversion arrays 112 store halftone data for print engine 114 as an array of pixel or pel values that correspond to a particular index. For example, conversion arrays 112 may be a 3×3×256 array of values. In the example, 3×3 represents the size of a halftone cell, and 256 represents the number of entries for each element in the halftone cell.

Control system 108 indexes conversion arrays 112 using one or more bytes of bitmap data in the packet (step 206 of FIG. 2). Indexing conversion arrays 112 provides access to the byte(s) stored at a particular indexed location. In this embodiment, the indexing values provided to conversion arrays 112 are the RL encoded blocks of data encapsulated in the RL formatted packets. The values stored at any particular indexed position in conversion arrays 112 are one or more halftone pel values for print engine 114. Indexing conversion arrays 112 allows control system 108 to output halftone data from conversion arrays 112 based on the index (step 208 of FIG. 2). Because conversion arrays 112 store one or more halftone pel values for print engine 114, computationally intensive thresholding comparisons are avoided. This improves the efficiency of the halftoning process. Steps 202-208 of method 200 may be repeated as packets of RL encoded data are identified and halftoned using conversion arrays 112.

In some embodiments, conversion arrays 112 may store multiple halftone pixel outputs for print engine 114 within the same entry or indexed location. For example, if a yellow color channel for print engine 114 is two bits wide, then one byte of data at a particular indexed location in conversion arrays 112 may store 4 pels of halftone output (8 bits per byte/2 bits per pel for the yellow color channel). Thus, if a repeat block of bitmap data is used as an index to conversion arrays 112, then there is an opportunity to decode multiple halftone output pels using one indexing operation. Also, the same entry or indexed location may store a packed scanline of pel data for a halftone cell in a single array entry. A scanline is a line of pels across a media. For instance, a packed scanline for a 2 bit halftone cell 256 pixels wide is 64 bytes.

One skilled in the art would understand that the number of bytes of data that may be stored at a particular index in conversion arrays 112 is a matter of design choice. In a 64 bit word environment, a designer may wish to implement 8 bytes of data at each entry for conversion arrays 112. In continuing with our 2 bit yellow color channel example, this allows 32 pels of halftone data to be output from conversion arrays 112 using a single indexing operation. This provides a significant advantage over performing a thresholding process on 32 input pixels of data to generate the 32 pels of halftone output.

When the RL encoded data includes multiple runs of repeat data, this improves the efficiency of the halftoning process. For instance, if a packet of RL data encodes 30 bytes of repeat data, and our example array of conversion values is capable of storing up to 8 bytes of output data per index, this allows one byte of RL repeat data to be used to fetch or output up to 32 halftone pels to print engine 114. This reduces the computational complexity of the halftoning process, as multiple halftone pixels may be output for a single indexing operation to conversion arrays 112.

In other embodiments, print controller 104 may process uncompressed bitmap data to generate indexing bytes to conversion arrays 112. In this other embodiment, print controller 104 identifies runs of repeat data in the uncompressed bitmap data, and builds an index value based on the number of runs and the value of the repeat data. Thus, the use of conversion arrays 112 by print controller 104 is not necessarily limited to use with RL encoded datastreams.

Figure 3:
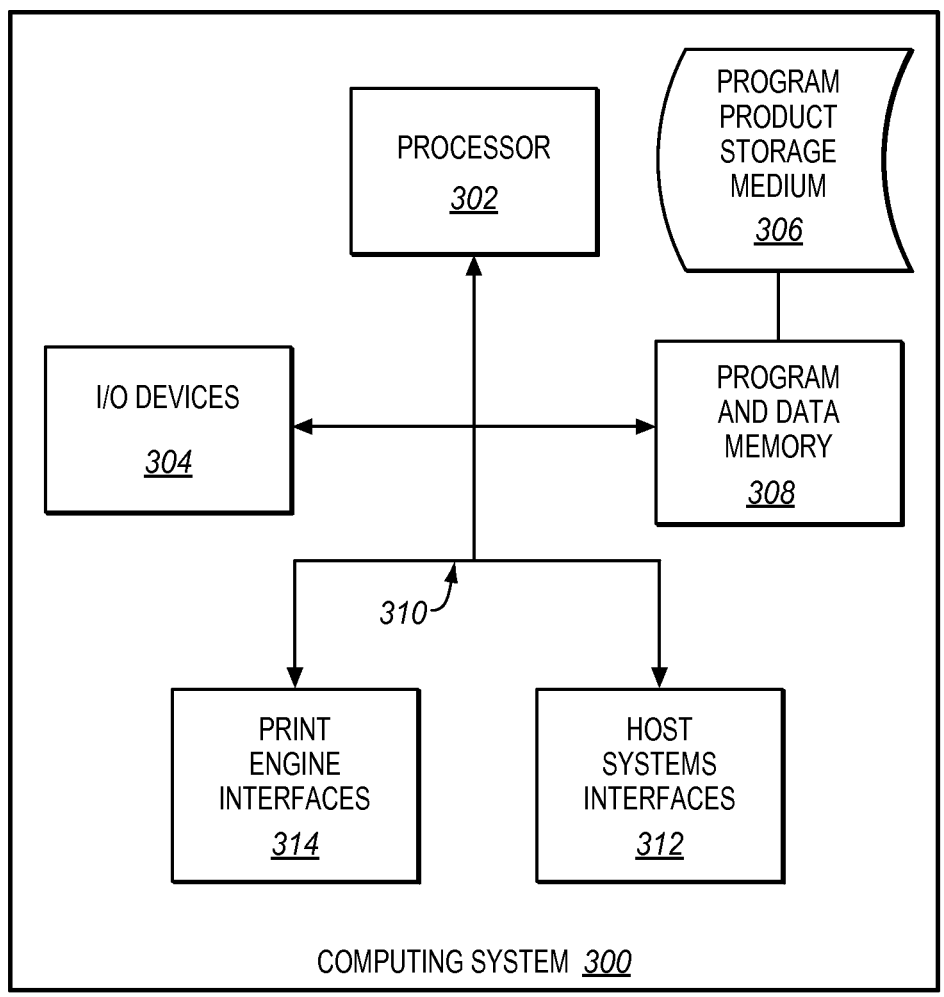
FIG. 3 illustrates a computing device in which a computer readable medium may provide the methods disclosed herein in an exemplary embodiment.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 3 illustrates a computing device in which a computer readable medium 306 may provide instructions for performing method 200 disclosed herein in an exemplary embodiment.

Furthermore, the invention can take the form of a computer program product accessible from a computer-usable or computer-readable medium 306 providing program code for use by or in connection with a computer or any instruction execution system. For the purposes of this description, a computer-usable or computer readable medium 306 can be any apparatus that can contain, store, communicate, or transport the program for use by or in connection with the instruction execution system, apparatus, or device.

The medium 306 can be an electronic, magnetic, optical, electromagnetic, infrared, or semiconductor system (or apparatus or device). Examples of a computer-readable medium 306 include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor 302 coupled directly or indirectly to memory elements 308 through a system bus 310. The memory elements 308 can include local memory employed during actual execution of the program code, bulk storage, and cache memories which provide temporary storage of at least some program code in order to reduce the number of times code is retrieved from bulk storage during execution.

Input/output or I/O devices 304 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 312, or remote printers or storage devices through intervening private or public networks, such as through print engine interfaces 314. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

I claim:

1. A print controller comprising:
   an array operable to store pre-calculated halftone output values in storage entries, wherein the storage entries are addressable by Run length (RL) encoded data values that correspond with the pre-calculated halftone output values;

an identification system operable to identify a first packet within a Run length (RL) encoded datastream, wherein the first packet comprises a first header and a first data block defined by the first header, and wherein the first data block comprises continuous tone data; and a control system operable to locate a storage entry in the array using one or more bytes of the first data block, and to retrieve a pre-calculated halftone output value at the storage entry to directly convert the RL encoded continuous tone data of the first packet to halftone data for a print engine.

2. The print controller of claim 1 wherein:

the control system is further operable to determine that the entries of the array comprise successive pels of halftone data; and the control system is further operable to determine that the first header defines a number (n) of repeating data blocks in the first packet, to index the array using the data block, and to output (n) successive pels of halftone data from the array based on the index.

3. The print controller of claim 2 wherein:

the control system is further operable to determine that an entry of the array encodes a packed scanline of pel data for a halftone cell.

4. The print controller of claim 1 wherein:

the control system is further operable to identify a second packet within the RL datastream, wherein the second packet comprises a second header subsequent to the first packet and a second data block defined by the second header; and the control system is further operable to index the array using one or more bytes of the second data block, and to output halftone data from the array for the print engine based on the index to convert the RL encoded continuous tone data of the second packet to halftone data.

5. The print controller of claim 1 wherein:

the control system is further operable to determine that the array is a 3-dimensional array of conversion values defining a halftone cell for halftoning the RL encoded datastream.

6. The print controller of claim 5 wherein:

the control system is further operable to determine that the array indexes a byte of data that encodes multiple halftone pels for an output channel of the print engine, wherein a number of bits per pel corresponds to a width of the output channel.

7. The print controller of claim 1 wherein:

the identification system is further operable to identify a successive number of repeat blocks of continuous tone data within an uncompressed datastream, and to identify a value of the repeat blocks; and the control system is further operable to generate an index for the array based on the number and the value of the repeat blocks, to index the array using the generated index, and to output halftone data from the array based on the generated index to convert repeat blocks of continuous tone data to halftone data for a print engine.

8. A method operable on a print controller, the method comprising:

storing, in an array, pre-calculated halftone output values in storage entries, wherein the storage entries are addressable by Run length (RL) encoded data values that correspond with the pre-calculated halftone output values;

identifying, with the print controller, a first packet within a Run length (RL) encoded datastream, wherein the first packet comprises a first header and a first data block defined by the first header, and wherein the first data block comprises continuous tone data;

locating a storage entry in the array using one or more bytes of the first data block;

retrieving, with the print controller, a pre-calculated halftone output value at the storage entry to directly convert the RL encoded continuous tone data of the first packet to halftone data for a print engine.

9. The method of claim 8 further comprising:

determining that the first header defines a number (n) of repeating data blocks in the first packet, wherein the values of the array comprise successive pels of halftone data;

indexing the array using the data block; and outputting (n) successive pels of halftone data from the array based on the index.

10. The method of claim 9 wherein identifying the array further comprises:

identifying an entry in the array of conversion values that defines a packed scanline of pel data for a halftone cell.

11. The method of claim 8 further comprising:

identifying a second packet within the RL datastream, wherein the second packet comprises a second header subsequent to the first packet and a second data block defined by the second header;

indexing the array using one or more bytes of the second data block; and outputting halftone data from the array for the print engine based on the index to convert the RL encoded continuous tone data of the second packet to halftone data.

12. The method of claim 8 wherein identifying the array further comprises:

identifying a 3-dimensional array of conversion values that define a halftone cell for halftoning the RL encoded datastream.

13. The method of claim 12 wherein identifying the array further comprises:

identifying an array of conversion values encoding multiple halftone pels for an output channel of the print engine, wherein a number of bits per pel corresponds to a width of the output channel.

14. The method of claim 8 further comprising:

identifying a number of successive repeat blocks of continuous tone data within an uncompressed datastream;

identifying a value of the repeat blocks of continuous tone data;

generating an index for the array based on the number and the value of the repeat blocks;

indexing the array using the generated index; and outputting halftone data from the array based on the generated index to convert the repeat blocks of continuous tone data to halftone data for a print engine.

15. A tangible computer readable medium embodying programmed instructions which, when executed by a processor of a print controller, are operable for performing a method, the method comprising:

storing, in an array, pre-calculated halftone output values in storage entries, wherein the storage entries are addressable by Run length (RL) encoded data values that correspond with the pre-calculated halftone output values;

identifying a first packet within a Run length (RL) encoded datastream, wherein the first packet comprises a first header and a first data block defined by the first header, and wherein the first data block comprises continuous tone data;

locating a storage entry in the array using one or more bytes of the first data block;

retrieving, with the print controller, a pre-calculated halftone output value at the storage entry to directly convert the RL encoded continuous tone data of the first packet to halftone data for a print engine.

16. The medium of claim 15, wherein the method further comprises:
   determining that the first header defines a number (n) of repeating data blocks in the first packet, wherein the values of the array comprise successive pels of halftone data;
   indexing the array using the data block; and
   outputing (n) successive pels of halftone data from the array based on the index.

17. The medium of claim 16, wherein identifying the array further comprises:
   identifying an entry in the array of conversion values that defines a packed scanline of pel data for a halftone cell.

18. The medium of claim 15, wherein the method further comprises:
   identifying a second packet within the RL datastream, wherein the second packet comprises a second header subsequent to the first packet and a second data block defined by the second header;
   indexing the array using one or more bytes of the second data block; and
   outputting halftone data from the array for the print engine based on the index to convert the RL encoded continuous tone data of the second packet to halftone data.

19. The medium of claim 15, wherein the identifying the array further comprises:
   identifying a 3-dimensional array of conversion values that define a halftone cell for halftoning the RL encoded datastream.

20. The medium of claim 19, wherein the identifying the array further comprises:
   identifying an array of conversion values encoding multiple halftone pels for an output channel of the print engine, wherein a number of bits per pel corresponds to a width of the output channel.

\* \* \* \* \*